(12) United States Patent
Peddireddy et al.

(10) Patent No.: US 12,494,854 B2
(45) Date of Patent: Dec. 9, 2025

(54) AMBIENT RF/WiFi ENERGY HARVESTING, INDOOR LOCATION TRACKING AND IMPROVED Wi-Fi CONNECTIVITY USING MACHINE LEARNING ALGORITHM

(71) Applicant: Intel Corporation, Santa Clara, CA (US)

(72) Inventors: Prathibha Peddireddy, Bangalore (IN); Maruti Tamrakar, Tamil-Nadu (IN); Zaman Zaid Mulla, Mumbai (IN); Jayprakash Thakur, Bangalore (IN); Mythili Hegde, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 17/558,604

(22) Filed: Dec. 22, 2021

(65) Prior Publication Data
US 2023/0198641 A1  Jun. 22, 2023

(51) Int. Cl.
*H04B 17/27* (2015.01)
*H04B 1/00* (2006.01)
*H04B 7/06* (2006.01)
*H04B 17/318* (2015.01)
*H04W 64/00* (2009.01)

(52) U.S. Cl.
CPC ........... *H04B 17/27* (2015.01); *H04B 1/0064* (2013.01); *H04B 7/0608* (2013.01); *H04B 17/318* (2015.01); *H04W 64/003* (2013.01)

(58) Field of Classification Search
CPC .... H04B 17/27; H04B 1/0064; H04B 7/0608; H04B 17/318; H04W 64/003; H04W 4/02; H04W 4/029; G01S 5/0269; G01S 11/06
See application file for complete search history.

(56) References Cited

U.S. PATENT DOCUMENTS

| | | | |
|---|---|---|---|
| 11,096,008 B1* | 8/2021 | Batten | G01S 5/02523 |
| 11,212,681 B1* | 12/2021 | Balaramn | H04L 63/1466 |
| 2017/0127250 A1* | 5/2017 | Zhou | H04W 4/029 |
| 2019/0281555 A1* | 9/2019 | Hou | H04W 52/0229 |
| 2020/0022217 A1* | 1/2020 | Ringland | H04W 16/20 |
| 2020/0227813 A1* | 7/2020 | Yehezkely | H04W 4/70 |
| 2021/0385621 A1* | 12/2021 | Vo | H04W 4/029 |
| 2023/0140778 A1* | 5/2023 | Abotabl | H04W 52/0216 370/311 |

* cited by examiner

*Primary Examiner* — Christopher M Brandt
(74) *Attorney, Agent, or Firm* — Viering, Jentschura & Partner mbB

(57) ABSTRACT

A wireless communication device including a processor; a memory, coupled to the processor, to store instructions, which when executed by the processor, cause the processor to: connect an antenna to an energy harvesting (EH) circuit, wherein the antenna is configured to capture a Wi-Fi radio frequency (RF) signal; send the Wi-Fi RF signal to the EH circuit; determine a RF signal strength of the Wi-Fi RF signal; and determine a location of the wireless communication device based on the RF signal strength.

17 Claims, 6 Drawing Sheets

AMBIENT RF/WiFi ENERGY HARVESTING, INDOOR LOCATION TRACKING AND IMPROVED Wi-Fi CONNECTIVITY USING MACHINE LEARNING ALGORITHM

TECHNICAL FIELD

This disclosure generally relates to methods and devices for location tracking in indoor environments.

BACKGROUND

Global positioning system (GPS) or Cell tower-based location tracking is limited to device location tracking in outdoor environments. It becomes difficult to find a precise location of devices in indoor environments like offices or homes. Location tracking may use GPS signals to determine movement, such as vehicle movement, or device location by using the Global Navigation Satellite Systems (GNSS) network. This consists of satellites which communicate with GPS trackers that provide information related to location, speed, direction. GPS and cell towers require a direct line of sight to detect the location of a device. They are limited to tracking devices in indoor environments because satellite and cell tower signals may not be available inside the buildings.

Wi-Fi signals are often present inside indoor environments. Wi-Fi devices, such as laptops and mobile phones, use a relatively small amount of power to detect these Wi-Fi signals. Location tracking may use the Wi-Fi signals as in input into a trilateration algorithm to detect a device location.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
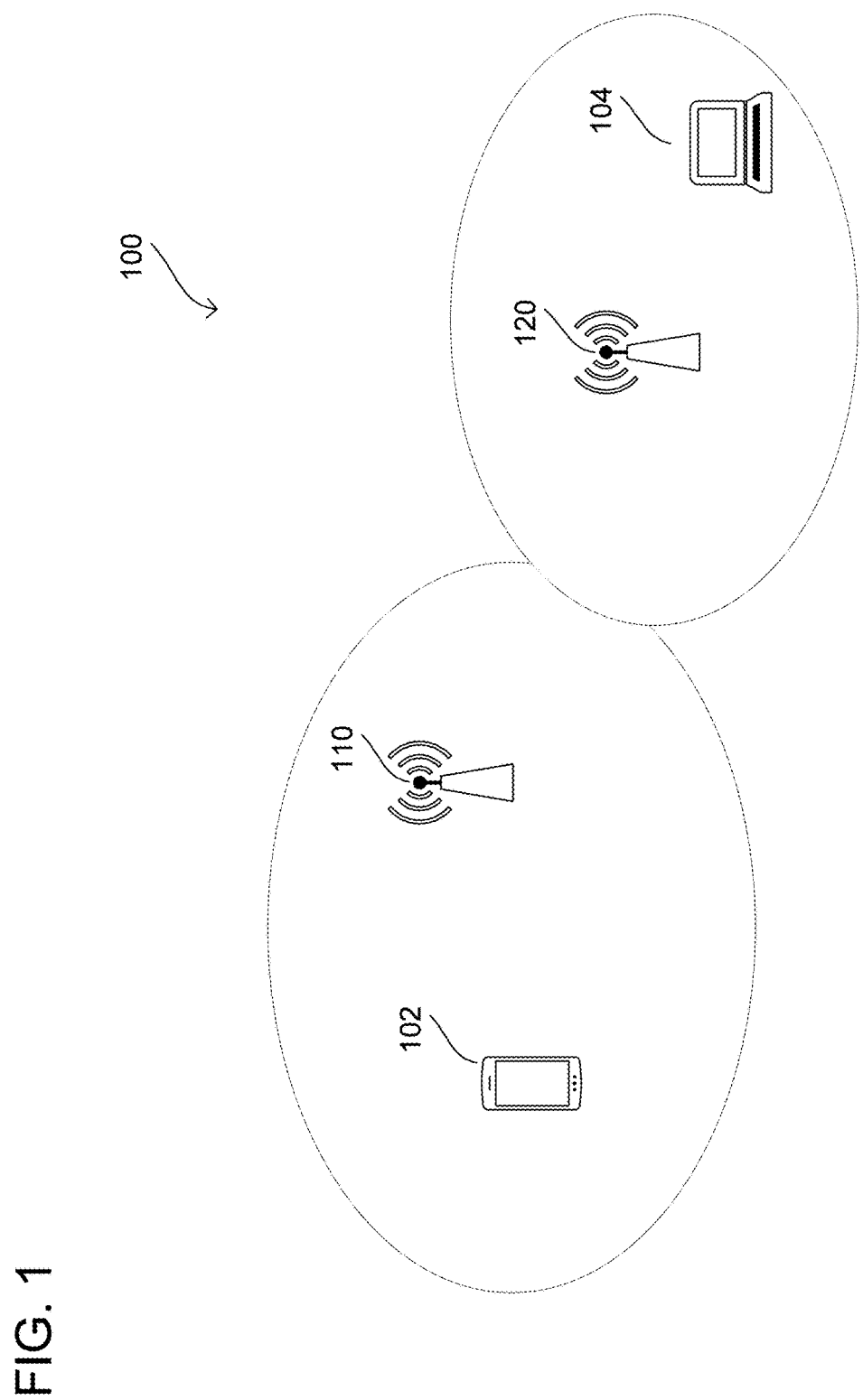
FIG. 1 shows an exemplary radio communication network.

The following detailed description refers to the accompanying drawings that show, by way of illustration, specific details in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Examples of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs (gNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

This disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Examples described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include International Mobile Telecommunications (IMT) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Examples described herein can also implement a hierarchical application of the scheme, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Examples described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.].

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

Many wireless communication technologies use beamforming to increase link strength between transmitter and receiver. The Third Generation Partnership Project's (3GPP) Fifth Generation (5G) New Radio (NR) standard, for example, includes mechanisms for beamforming in both the transmit and receive directions. Focusing on the terminal side, a terminal device (e.g., a UE) may identify a receive antenna beam and a transmit antenna beam for a given network access node (e.g., gNodeB). In the receive direction, the terminal device can then increase link strength by receiving signals from the network access node with the receive antenna beam. Similarly, in the transmit direction the terminal device can boost link strength by transmitting signals to the network access node with the transmit antenna beam.

Location tracking of wireless communication devices in indoor environments may be limited or diminished due to undependable availability of GPS or network access node signals. However, indoor environments often have dependable Wi-Fi signal availability. A wireless communication device or UE may include an energy harvesting (EH) circuit. Electromagnetic waves of Wi-Fi signals may be converted into usable electricity. The energy of the Wi-Fi signals can be collected and stored using EH. The UE may accumulate and store the Wi-Fi radio frequency (RF) signals and, based on the on the receiver signal strength (RSS) of the RF Signals (Wi-Fi), determine the location of the UE in an indoor environment.

Figure 2:
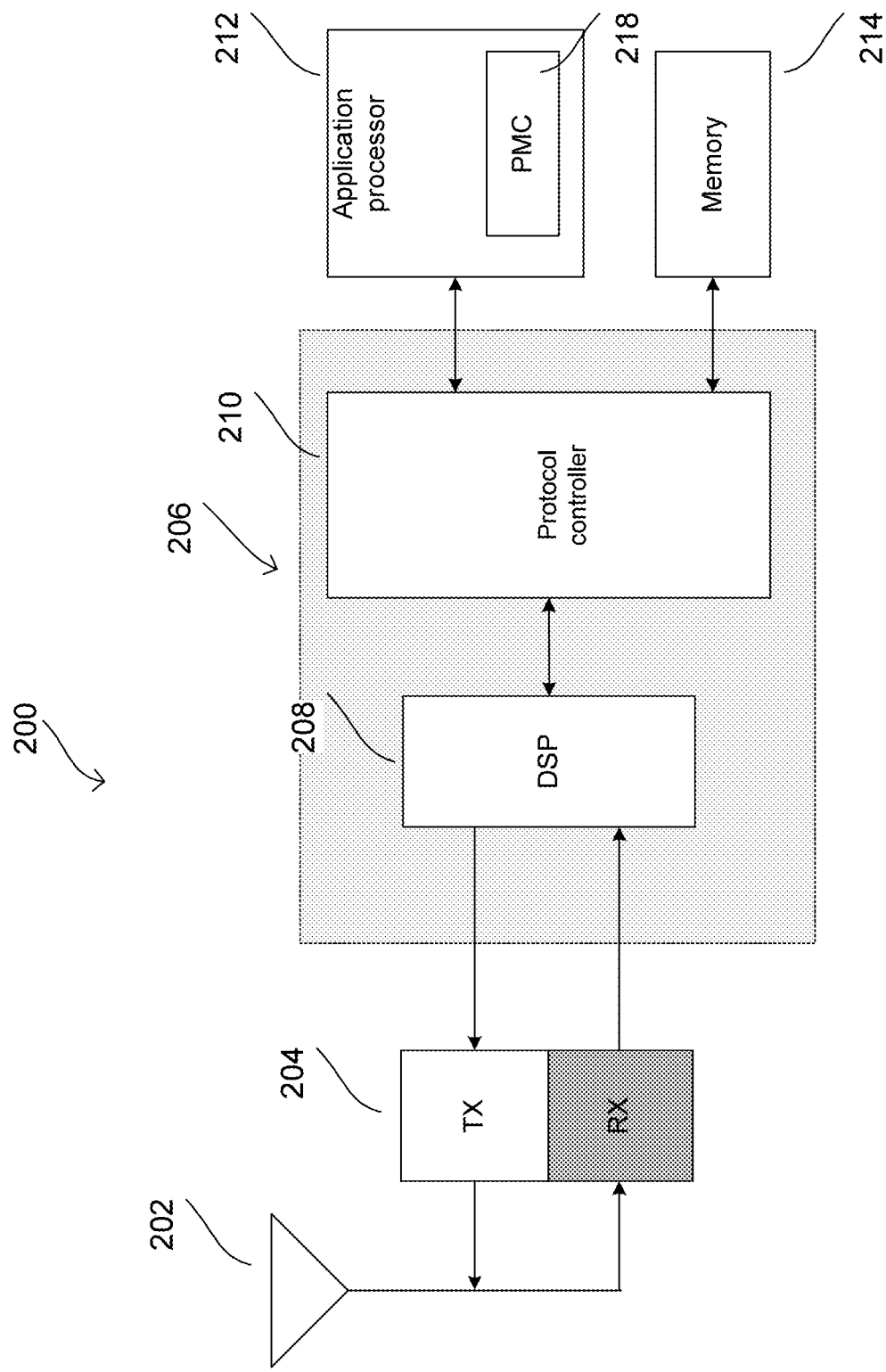
FIG. 2 shows an exemplary internal configuration of a terminal device.

FIGS. 1 and 2 show a general network and device architecture for wireless communications. FIG. 1 shows exemplary radio communication network 100, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks. In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

FIG. 2 shows an exemplary internal configuration of terminal device 200, which may include antenna system 202, radio frequency (RF) transceiver 204, baseband modem 206 (including digital signal processor 208 and protocol controller 210), application processor 212, and memory 214. Terminal device 200 may be any one of terminal device 102 or 104. Although not explicitly shown in FIG. 2, terminal device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 200 shown in FIG. 2 depicts only a single instance of such components.

Terminal device 200 may transmit and receive wireless signals with antenna system 202. Antenna system 202 may be a single antenna or may include one or more antenna arrays that each include multiple antenna elements. For example, antenna system 202 may include an antenna array at the top of terminal device 200 and a second antenna array at the bottom of terminal device 200. Antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. Baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. Digital signal processor 208 may include one or more processors configured to retrieve and execute program code that defines control and processing logic for physical layer processing operations. Digital signal processor 208 may execute processing functions with software via the execution of executable instructions. Digital signal processor 208 may include one or more dedicated hardware circuits (e.g., ASICs, FPGAs, and other hardware) that are digitally configured to specifically execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. The processor and hardware accelerator components of digital signal processor 208 may be realized as a coupled integrated circuit.

Terminal device 200 may be configured to operate according to one or more radio communication technologies. Digital signal processor 208 may be responsible for lower-layer processing functions (e.g. Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 200 may also include application processor 212 and memory 214. Application processor 212 may be a CPU, and may be configured to handle the layers above the protocol stack, including the transport and application layers. Application processor 212 may be configured to execute various applications and/or programs of terminal device 200 at an application layer of terminal device 200, such as an operating system (OS), a user interface (UI) for supporting user interaction with terminal device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory circuitry or storage element of terminal device 200, such as a hard drive or another such permanent memory device. Although not explicitly depicted in FIG. 2, the various other components of terminal device 200 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 120. If the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

UE location tracking in an indoor environment may use an EH circuit to harvest Wi-Fi RF signals to determine the EU location. The EH circuit may harvest Wi-Fi RF signal energy which is readily available in many indoor environments. The location tracking algorithm may use Wi-Fi signal EH to determine the location of a device in indoor environments. The EH circuit can be implemented within a wireless communication device to charge a battery or supercapacitor of the device. EH may accumulate and store the RF signals energy and determine the device location based on the receiver signal strength (RSS) of the RF signals. A machine learning (ML) algorithm may further optimize channel selection to improve the throughput or connectivity and receive maximum ambient RF power.

Wi-Fi RF signals are ubiquitous, especially in indoor environments and Wi-Fi devices are often exposed to the Wi-Fi RF signals emitted from the Wi-Fi routers or APs. Including an EH circuit within a Wi-Fi device may charge a battery or super capacitor of the device form the ambient Wi-Fi RF signals. The harvested energy can be stored to power up the device such that it can send a beacon or signal to the nearest Wi-Fi AP. Once the AP receives a beacon from the Wi-Fi device, the location of the AP will be known. Based on the RSSI value, the device location will be calculated as all the APs are connected to a centralized cloud and the location of the APs is known. A machine learning algorithm may further select an optimal channel for Wi-Fi communication, based on the RSSI values, to improve connectivity.

Figure 3:
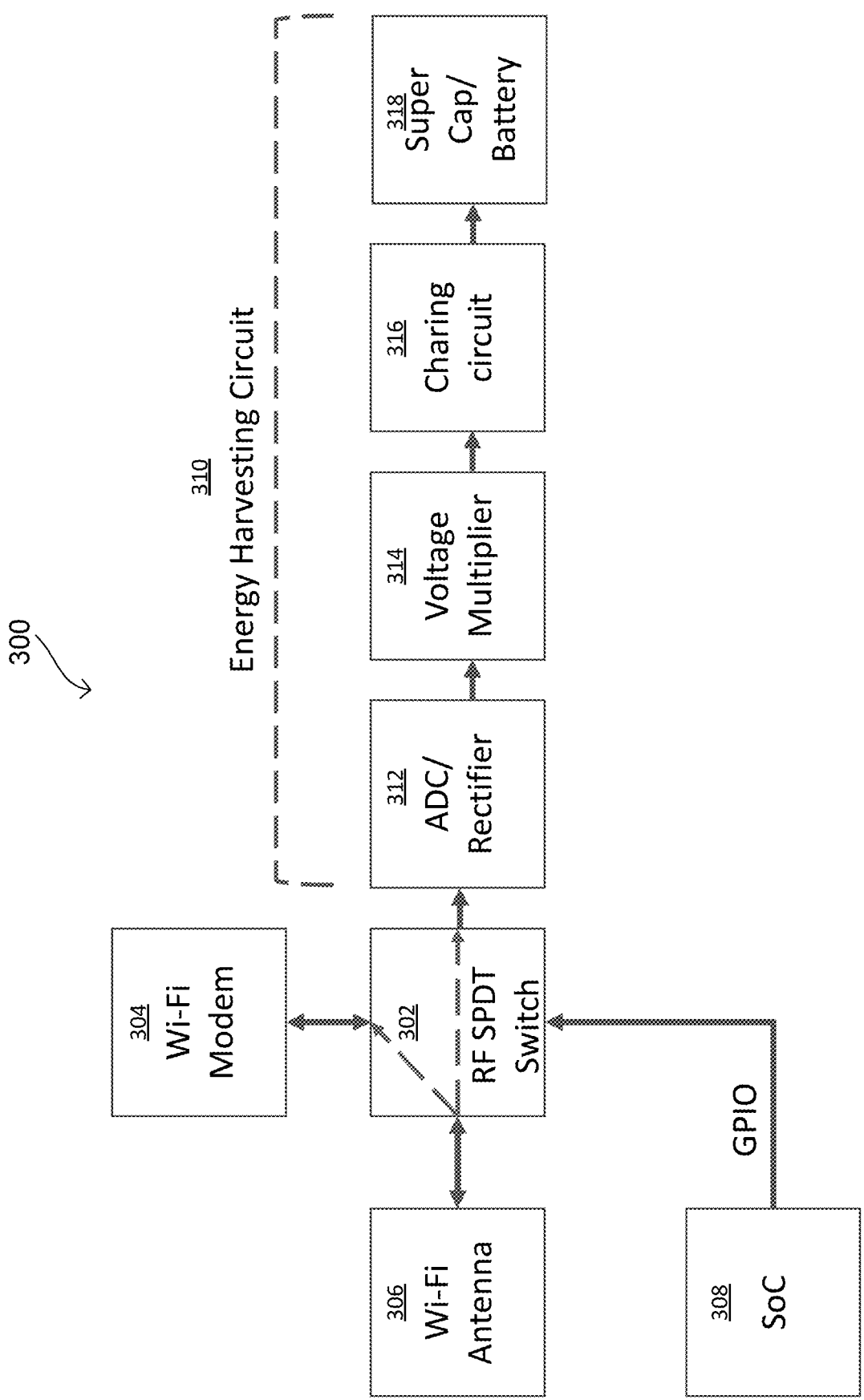
FIG. 3 shows exemplary circuit diagram for Wi-Fi energy harvesting.

FIG. 3 shows an exemplary circuit diagram 300 for Wi-Fi energy harvesting. Circuit diagram 300 may be included in a terminal device such as terminal device 200. Circuit diagram 300 may include switch 302 coupled to modem 304 and antenna 306. Switch 302 may be a two-way switch. Modem 304 may be similar to baseband modem 206 of FIG. 2 and antenna 306 may be similar to antenna system 202 of FIG. 2. Switch 302 may connect antenna 306 to modem 304 or connect antenna 306 to EH circuit 310.

When antenna 306 is connected to modem 304, the circuit 300 may be configured for communication according to a Wi-Fi protocol. When antenna 306 is connected to EH circuit 310, the circuit 300 may be configured to harvest energy from Wi-Fi RF signals. Circuit 300 may further include integrated circuit 308. Integrated circuit 308 may be a system on a chip (SoC) circuit. Integrated circuit 308 may control switch 302 to switch a connection from antenna 306 between modem 304 and EH circuit 310. For example, when Wi-Fi of a terminal device is turned on, circuit 308 may control switch 302 to connect antenna 306 to modem 304. Otherwise, circuit 308 may control switch 302 to connect antenna 306 to EH circuit 310.

When circuit 300 is configured to harvest energy, antenna 306 may be connected to EH circuit 310. EH circuit may include rectifier 312, voltage multiplier 314, charging circuit 316, and energy storage 318. Rectifier 312 may receive a RF signal from antenna 306. It should be noted that EH circuit 310 may be any circuit capable of harvesting energy from RF signals and include different components.

Rectifier 312 may receive the RF signals and convert the ambient energy of the RF signals into electrical energy. Voltage multiplier 314 may extract the maximum possible amount of energy from rectifier 312 and convert the energy into a suitable from a terminal device, for example terminal device 200. Voltage regulator 316 may regulate the energy from voltage multiplier 314 and charge an energy storage 318, for example a battery or super capacitor.

It should be noted that there may be different configurations of EH circuits. But any EH circuit that is capable of receiving RF signals from an antenna and convert them into suitable energy may be included in a terminal device for EH. EH of based station (BS) signals in the 900 MHz frequency band is already a common technique. The EH circuit may be configured to only harvest RF signals from the air within a Wi-Fi frequency band. For example, RF signals in the 2.4 GHz, 3.6 GHz, 4.9 GHz, 5 GHz, and 5.9 GHz bands. The RF waves cause a potential difference across the length of the wave. The potential difference causes charge carriers to move along the length of the antenna. The EH circuit is then able to convert the energy from this movement into a suitable energy which is then stored in a capacitor or battery. The device does not need to be connected to the Wi-Fi network to harvest the RF signals. For example, harvesting public Wi-Fi signals to determine a device location without the device being connected to the public Wi-Fi network.

EH may use existing antennas in UEs or terminal devices without hardware modification. Wi-Fi EH may improve Wi-Fi communication by improving channel allocation through channel switching as described below. Any Wi-Fi enabled device may be configured to harvest energy from Wi-Fi RF signals to charge wirelessly, even when the battery of the device is completely drained. For example, smart keys, mobile phones, hot spot devices with a dead battery may harvest the energy of Wi-Fi RF signals. Harvesting Wi-Fi signals may be useful for using mobile phone with a drained battery in an emergency situation. The harvested Wi-Fi RF signals may further be the basis for determining the location of the device in an indoor environment using a signal strength or RSSI measurements.

Switch 302 may include a switching network or RF power coupler and connects the EH Circuit 310 to antenna 306. Antenna 306 captures a Wi-Fi and forwards the signal to switch 302. Switch 302 enables the EH feature whenever Wi-Fi connectivity is not in use for the terminal device. The Wi-Fi signal is a RF/AC signal. However, a DC signal is needed to charge the battery or super capacitor. Rectifier 312 may include an AC to DC convertor circuit (ADC/Rectifier) to convert the Wi-Fi RF signals into suitable energy. The captured Wi-Fi signal strength may be low and requires a voltage multiplier. Voltage multiplier 314 may boost the voltage level to the desired charging voltage. For example, terminal device 200 may include a standard voltage level needed to charge battery 318. Therefore, charging circuit 316 may include a voltage regulator to maintain constant voltage at the input of battery 318. The charging speed may vary based the current level in EH circuit 310. When the Wi-Fi signal strength is good, for example −10 dBm and −80 dBm, the current in EH circuit 310 will also be high and therefore the charging speed will also be high. The higher the RSSI measurement value the better the charging speed will be.

Indoor location tracking may have several applications as a security feature. For example, access control, emergency situations, asset tracking, etc. Access control may limit a high security location to authorized personnel. Detection of unauthorized personnel wearing an RFID badge may generate an alert to security personnel. During an emergency situation, such as a fire, indoor location tracking can identify at risk personnel who have not evacuated. Tracking highly sensitive assets or equipment using indoor location tracking. If a highly sensitive asset leaves its designated area, an alert can be generated.

Reusing the energy from ambient Wi-Fi signals for indoor location tracking and charging a device increases a communication devices sustainability. For example, by reusing the ambient Wi-Fi signals for the purpose of location tracking no, new energy is not generated for the purpose of location tracking. Additionally, harvesting the energy from ambient Wi-Fi signals allows a device to charge its battery, or energy storage, without required to draw electricity from an electrical outlet.

Figure 4:
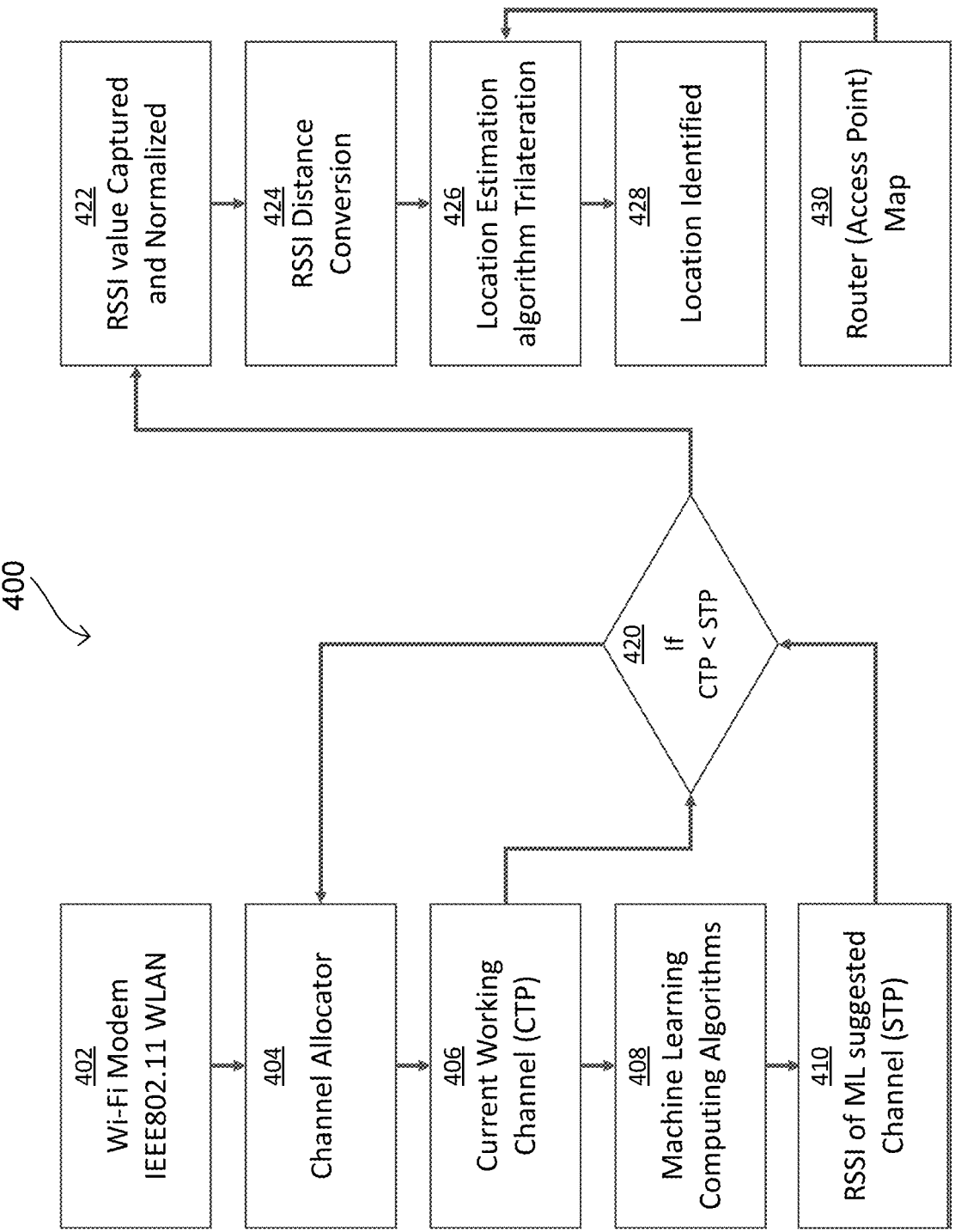
FIG. 4 shows exemplary flow chart for Wi-Fi channel hopping and indoor location tracking.

FIG. 4 shows exemplary flow chart of method 400 for Wi-Fi channel hopping and indoor location tracking of a terminal device. Method 400 may determine a Wi-Fi device location and an optimal channel based on harvested RF signals. For example, the harvested signals as described with respect to FIG. 3. Method 400 may include several steps to determine a device location and channel hop. Step 402 may analyze and/or measure Wi-Fi RF signals. A terminal device may also use the Wi-Fi RF signals of step 402 for energy harvesting. Step 404 may allocate a channel for Wi-Fi communication of a terminal device. Channel allocation in step 404 may allocate bandwidth and communication channels according to a channel allocation scheme. For example, a dynamic channel allocation (DCA) scheme. Step 404 may also include channel hopping based on feedback from step 420 described below. Step 404 may select a new channel, or hop channels, based on a comparison of the current throughput with a suggested throughput of the new channel. If the new channel provides better throughput, step 404 may allocate the new channel which provides better signal reception. The better signal reception may improve, indoor tracking, energy harvesting, and Wi-Fi communication. Step 406 may measure or determine the current throughput of the allocated channel from step 404. Step 408 may determine a suggested channel. Step 408 may determine a suggested channel using a machine learning algorithm. Step 408 may include a variety of machine learning algorithms to determine a suggested channel. For example, regression analysis, random forest, support vector machine, neural network, etc. Step 410 may determine the receiver signal strength indicator (RSSI) for the suggested channel of step 408. The RSSI may measure the power present in a radio signal of the suggested channel. Step 410 may further determine the suggested throughput of the suggested channel based on the RSSI. Step 420 may compare the current throughput from step 406 and the suggested throughput from step 410. If the current throughput of the allocated channel is less than the suggested throughput of the suggested channel, Step 420 sends a message to step 404 to change or hop channels from the allocated channel to the suggested channel.

If the current throughput of the allocated channel is not less than the suggested throughput of the suggested channel, Step 420 sends a message to step 422 with the RSSI of the allocated channel. Step 422 may determine the RSSI value of the current allocated channel or a suggested channel from step 410 and normalize the RSSI values. The normalization process may include creating a reference point with respect to distance and RSSI value and create a look up table to co-relate distance with RSSI values. For example, the RSSI value may be normalized using the sum of squared errors (SSE). Step 424 may take the normalized RSSI value from step 422 and determine a distance between the terminal device and the source of the RF signal from step 402. Step 426 may obtain the distance from step 424 and a map 430 of positions of Wi-Fi access points as input into a location estimation algorithm. For example, step 426 may include a trilateration algorithm. The trilateration algorithm may include as input the RSSI value from the terminal device to several different access points (AP), and use a propagation model to determine the distance between the terminal device and the access points as described in step 424. Step 428 may be the output of step 426 which estimate the terminal device location relative to the known position of the access points.

Additionally, step 420 may also send a message to step 404 with the results of a comparison of the current allocation channel and a suggested channel from step 410. Step 404 may change or hop channels from the current allocated channel to the suggested channel based on the comparison as previously described.

An algorithm may determine the device location of a connected Wi-Fi communication device location in an indoor environment based on a Wi-Fi AP location and an RSSI value. Indoor Location Tracking algorithm 400 may receive signal strength information for signals a Wi-Fi antenna captures. The RSSI value may be normalized for distance calculation. The distance may be predicted from a RSSI distance conversion lookup table. The coordinate based algorithms, for example geometrical and statistical method algorithms, may identify the location of a Wi-Fi device because the AP location information is known. The predicted location of the Wi-Fi device may not be an exact location and include an acceptable margin of error.

Figure 5:
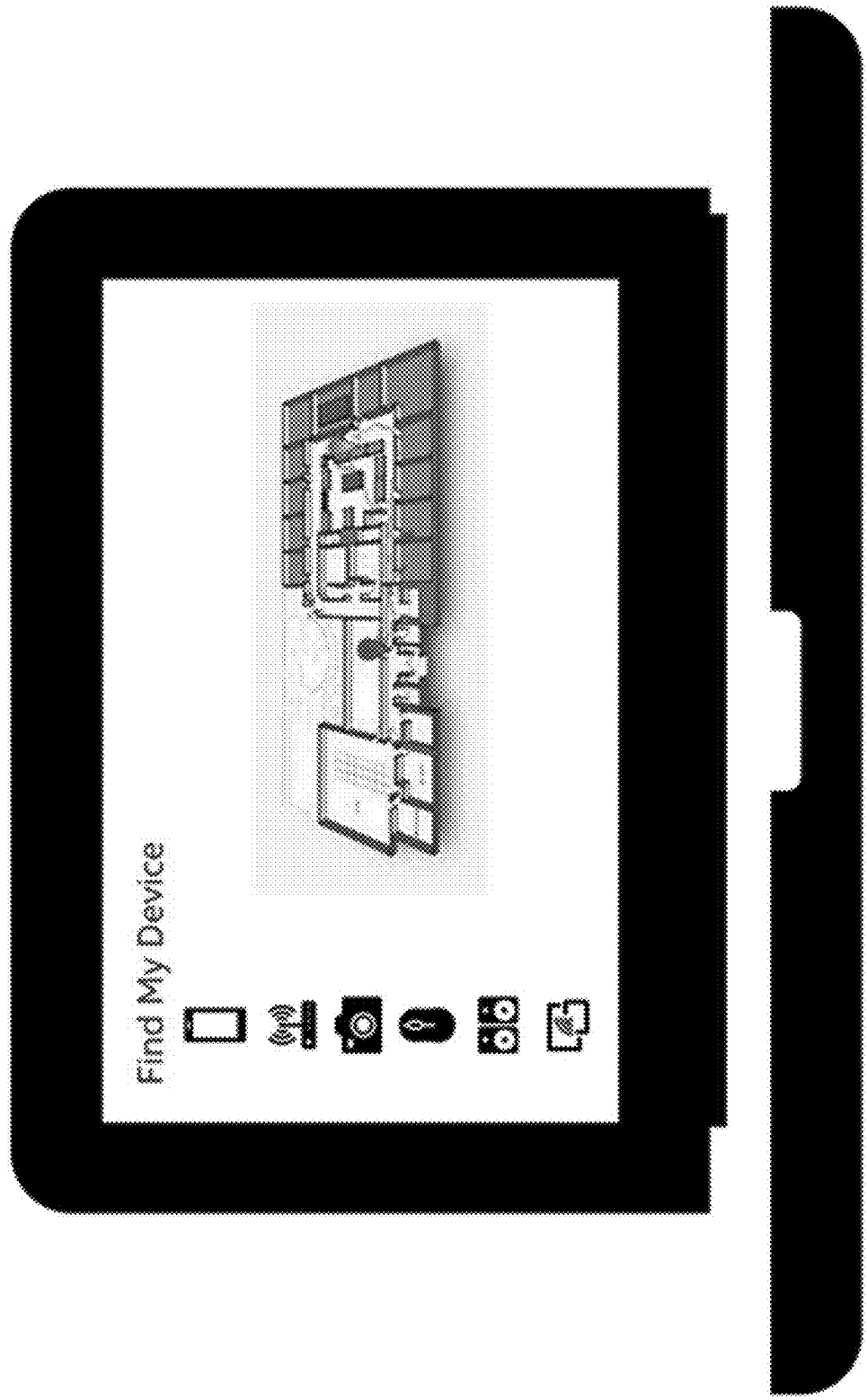
FIG. 5 shows exemplary Wi-Fi enabled device.

FIG. 5 shows a Wi-Fi enabled device 500 configured for location tracking. Device 500 may include circuit 300 for EH. Device 500 may further include a memory storing instructions to determine location based on harvested signals. Harvesting energy can be done by processing and storing ambient RF power in the vicinity of device 500. Wi-Fi channel allocation is an important factor in WLAN connectivity to receive a maximum radiated power. Limiting the set of channels distributing among every node is a critical task which can be resolved intelligently by ML algorithms. Using deep reinforcement learning algorithms such as Neural Network, Support Vector Machine, or Random Forest, to determine an optimal channel allocation avoids the hazard of allocating a random channel with power throughput power. Furthermore, LASSO, OLS (Ordinary Least Square), and Graph Convolutional Network algorithms can extract topology data of the Wi-Fi network.

Figure 6:
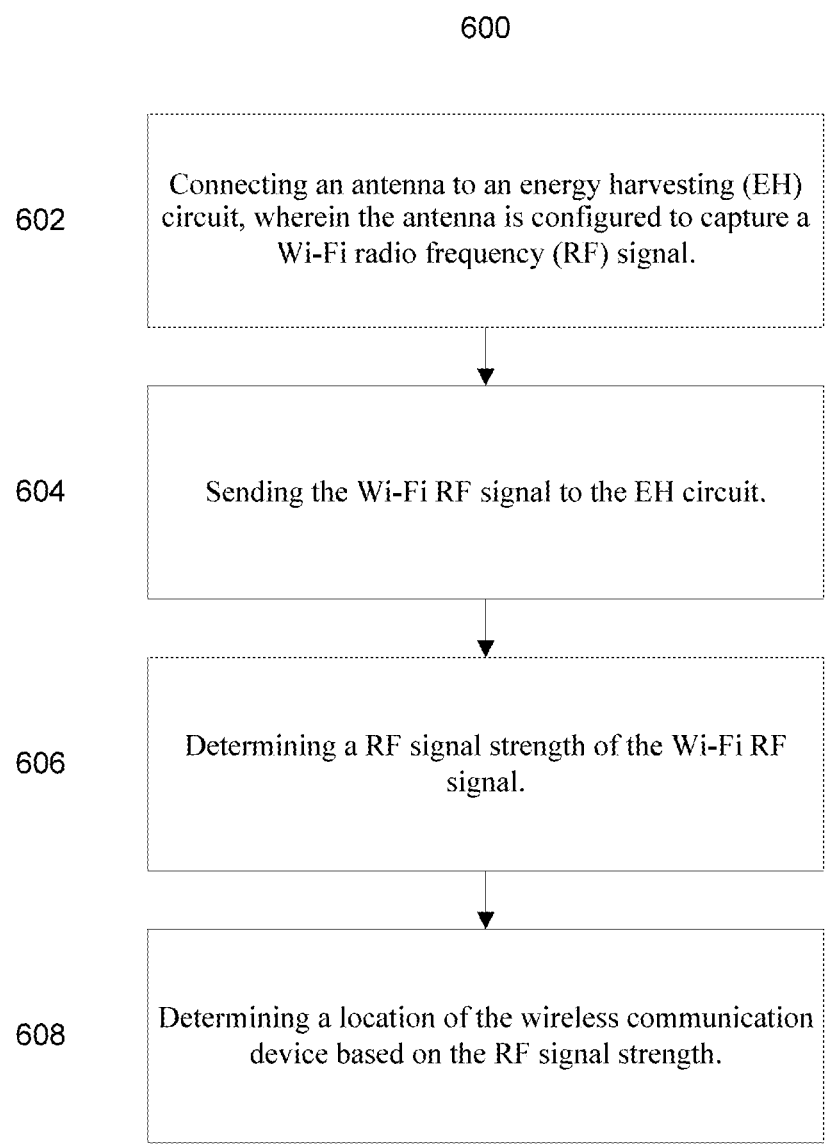
FIG. 6 shows an exemplary flow chart for indoor location tracking.

FIG. 6 illustrates an exemplary method 600 of determined device location. As shown in FIG. 6, method 600 includes connecting an antenna to an energy harvesting (EH) circuit, wherein the antenna is configured to capture a Wi-Fi radio frequency (RF) signal (stage 602); sending the Wi-Fi RF signal to the EH circuit (stage 604); determining a RF signal strength of the Wi-Fi RF signal (stage 606); and determining a location of the wireless communication device based on the RF signal strength (stage 608).

In the following, various aspects of the present disclosure will be illustrated:

In Example 1, a wireless communication device including a processor; a memory, coupled to the processor, to store instructions, which when executed by the processor, cause the processor to: connect an antenna to an energy harvesting (EH) circuit, wherein the antenna is configured to capture a Wi-Fi radio frequency (RF) signal; send the Wi-Fi RF signal to the EH circuit; determine a RF signal strength of the Wi-Fi RF signal; and determine a location of the wireless communication device based on the RF signal strength.

In Example 2, the subject matter of Example 1, may optionally further include a switch; and wherein the processor is further configured to switch the antenna from a connection to a Wi-Fi modem to the EH circuit.

In Example 3, the subject matter of any of Examples 1 and 2, may optionally further include wherein the EH circuit is configured to convert an alternating current (AC) of the Wi-Fi RF signal to a direct current (DC).

In Example 4, the subject matter of any of Examples 1 to 3, may optionally further include wherein the EH circuit includes an energy storage, and is further configured to store the DC in the energy storage.

In Example 5, the subject matter of any of Examples 1 to 4, may optionally further include wherein the EH circuit includes a voltage multiplier; and wherein the voltage multiplier is configured to multiply the DC energy to a predetermined voltage value.

In Example 6, the subject matter of any of Examples 1 to 5, may optionally further include wherein the processor is further configured to determine a distance between the wireless communication device and an access point based on the RF signal strength.

In Example 7, the subject matter of any of Examples 1 to 6, may optionally further include wherein the location of the wireless communication device is further based on the distance between the wireless communication device and the access point.

In Example 8, the subject matter of any of Examples 1 to 7, may optionally further include wherein the location of the wireless communication device is further based on a map of access points, wherein the map of access points includes a location of the access point.

In Example 9, the subject matter of any of Examples 1 to 8, may optionally further include the processor is further configured to generate a lookup table, wherein the lookup table associates a distance with the RF signal strength.

In Example 10, the subject matter of any of Examples 1 to 9, may optionally further include wherein the processor is further configured to lookup the RF signal strength in the lookup table to determine the distance.

In Example 11, the subject matter of any of Examples 1 to 10, may optionally further include wherein the processor is further configured to determine a further distance between the wireless communication device and a further access point based on a further RF signal strength.

In Example 12, the subject matter of any of Examples 1 toll, may optionally further include wherein the location of the wireless communication device is based on the distance between the wireless communication device and the access point and the further distance between the wireless communication device and the further access point.

In Example 13, the subject matter of any of Examples 1 to 12, may optionally further include, wherein the processor uses a trilateration algorithm to determine the location of the wireless communication device.

In Example 14, the subject matter of any of Examples 1 to 13, may optionally further include, wherein the processor is further configured to determine a throughput of a channel of the Wi-Fi RF signal and a further throughput of a further channel; and comparing the throughput and the further throughput.

In Example 15, the subject matter of any of Examples 1 to 14, may optionally further include wherein the processor is further configured to switch from the channel to the further channel based on the comparison.

In Example 16, the subject matter of any of Examples 1 to 15, may optionally further include wherein the processor is further configured to use a machine learning algorithm to determine the further throughput of the further channel, wherein the machine learning algorithm generates an RF signal strength value of the further channel.

In Example 17, a method including, connecting an antenna to an energy harvesting (EH) circuit, wherein the antenna is configured to capture a Wi-Fi radio frequency (RF) signal; sending the Wi-Fi RF signal to the EH circuit; determining a RF signal strength of the Wi-Fi RF signal; and determining a location of the wireless communication device based on the RF signal strength.

In Example 18, the subject matter of Example 17, may optionally further include switching the antenna from a connection to a Wi-Fi modem to the EH circuit.

In Example 19, the subject matter of any of Examples 17 and 18, may optionally further include converting an alternating current (AC) of the Wi-Fi RF signal to a direct current (DC).

In Example 20, the subject matter of any of Examples 17 to 19, may optionally further include wherein the EH circuit includes an energy storage, and storing the DC in the energy storage.

In Example 21, the subject matter of any of Examples 17 to 20, may optionally further include multiplying the DC energy to a predetermined voltage value.

In Example 22, the subject matter of any of Examples 17 to 21, may optionally further include determining a distance between the wireless communication device and an access point based on the RF signal strength.

In Example 23, the subject matter of any of Examples 17 to 22, may optionally further include wherein the location of the wireless communication device is further based on the distance between the wireless communication device and the access point.

In Example 24, the subject matter of any of Examples 17 to 23, may optionally further include wherein the location of the wireless communication device is further based on a map of access points, wherein the map of access points includes a location of the access point.

In Example 25, the subject matter of any of Examples 17 to 24, may optionally further include generating a lookup table, wherein the lookup table associates a distance with the RF signal strength.

In Example 26, the subject matter of any of Examples 17 to 25, may optionally further include wherein the processor is further configured to lookup the RF signal strength in the lookup table to determine the distance.

In Example 27, the subject matter of any of Examples 17 to 26, may optionally further include determining a further distance between the wireless communication device and a further access point based on a further RF signal strength.

In Example 28, the subject matter of any of Examples 17 to 27, may optionally further include wherein the location of the wireless communication device is based on the distance between the wireless communication device and the access point and the further distance between the wireless communication device and the further access point.

In Example 29, the subject matter of any of Examples 17 to 28, may optionally further include, determining the location of the wireless communication device using a trilateration algorithm.

In Example 30, the subject matter of any of Examples 17 to 29, may optionally further include, determining a throughput of a channel of the Wi-Fi RF signal and a further throughput of a further channel; and comparing the throughput and the further throughput.

In Example 31, the subject matter of any of Examples 17 to 29, may optionally further include switching from the channel to the further channel based on the comparison.

In Example 32, the subject matter of any of Examples 17 to 31, may optionally further include wherein determining the further throughput of the further channel using a machine learning algorithm, wherein the machine learning algorithm generates an RF signal strength value of the further channel.

In Example 33, a system including one or more devices according to Examples 1 to 16 configured to implement a method according to Examples 17 to 32.

In Example 34, one or more non-transitory computer readable media including programmable instructions thereon, that when executed by one or more processors of a device, cause the device to perform any one of the methods of Examples 17 to 32.

In Example 35, a means for implementing any of the Examples 1 to 16.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented with a corresponding method. It is thus understood that a device corresponding to a method detailed herein may include one or more components configured to perform each aspect of the related method.

All acronyms defined in the above description additionally hold in all claims included herein.

What is claimed is:

1. A wireless communication device comprising:
   a processor;
   a memory, coupled to the processor, to store instructions, which when executed by the processor, cause the processor to:
   connect an antenna to an energy harvesting (EH) circuit, wherein the antenna is configured to capture a Wi-Fi radio frequency (RF) signal on a plurality of wireless channels;
   send the Wi-Fi RF signal to the EH circuit;
   determine a corresponding throughput on an allocated channel of the plurality of wireless channels;
   switch to a new channel of the plurality of wireless channels based on the corresponding throughput on the allocated channel being below an expected throughput for the allocated channel, wherein the new channel is selected based on a machine learning model that relates characteristics of the Wi-Fi RF signal to estimated throughputs for each of the plurality of wireless channels;
   determine a RF signal strength of the Wi-Fi RF signal on the new channel; and
   determine a location of the wireless communication device based on the RF signal strength on the new channel.

2. The wireless communication device of claim 1, further comprising a switch; and wherein the processor is further configured to switch the antenna from a connection to a Wi-Fi modem to the EH circuit.

3. The wireless communication device of claim 1, wherein the EH circuit is configured to convert an alternating current (AC) of the Wi-Fi RF signal to a direct current (DC).

4. The wireless communication device of claim 3, wherein the EH circuit includes an energy storage, and is further configured to store the DC in the energy storage.

5. The wireless communication device of claim 4, wherein the EH circuit includes a voltage multiplier; and wherein the voltage multiplier is configured to multiply the DC energy to a predetermined voltage value.

6. The wireless communication device of claim 1, wherein the processor is further configured to determine a distance between the wireless communication device and an access point based on the RF signal strength.

7. The wireless communication device of claim 6, wherein the location of the wireless communication device is further based on the distance between the wireless communication device and the access point.

8. The wireless communication device of claim 7, wherein the location of the wireless communication device is further based on a map of access points, wherein the map of access points includes a location of the access point.

9. The wireless communication device of claim 7, wherein the processor is further configured to generate a lookup table, wherein the lookup table associates a distance with the RF signal strength.

10. The wireless communication device of claim 9, wherein the processor is further configured to lookup the RF signal strength in the lookup table to determine the distance.

11. The wireless communication device of claim 6, wherein the processor is further configured to determine a further distance between the wireless communication device and a further access point based on a further RF signal strength.

12. The wireless communication device of claim 11, wherein the location of the wireless communication device is based on the distance between the wireless communication device and the access point and the further distance between the wireless communication device and the further access point.

13. The wireless communication device of claim 12, wherein the processor uses a trilateration algorithm to determine the location of the wireless communication device.

14. A method comprising:
   connecting an antenna to an energy harvesting (EH) circuit of a wireless communication device, wherein the antenna is configured to capture a Wi-Fi radio frequency (RF) signal on an allocated channel of a plurality of wireless channels;
   sending the Wi-Fi RF signal to the EH circuit;
   determining a corresponding throughput on the allocated channel;
   switching to a new channel based on whether the throughput on the allocated channel is below an expected throughput for the allocated channel, wherein the new channel is selected based on a machine learning model that relates characteristics of the Wi-Fi RF signal to estimated throughputs for each of the plurality of wireless channels;
   determining a RF signal strength of the Wi-Fi RF signal on the new channel; and
   determining a location of the wireless communication device based on the RF signal strength on the new channel.

15. The method of claim 14, further comprising determining a distance between the wireless communication device and an access point based on the RF signal strength.

16. The method of claim 15, wherein the location of the wireless communication device is further based on the distance between the wireless communication device and the access point.

17. The method of claim 16, wherein the location of the wireless communication device is further based on a map of access points, wherein the map of access points includes a location of the access point.

* * * * *